(12) United States Patent
Pratt et al.

(10) Patent No.: US 6,686,560 B2
(45) Date of Patent: Feb. 3, 2004

(54) LIGHT-TIGHT POSITIONER

(75) Inventors: Vanon D. Pratt, Blanchester, OH (US); Erik Harrison Nieves, Centerville, OH (US); Todd Stucker, Troy, OH (US)

(73) Assignee: Motoman, Inc., West Carrollton, OH (US)

( * ) Notice: Subject to any disclaimer, the term of this patent is extended or adjusted under 35 U.S.C. 154(b) by 124 days.

(21) Appl. No.: 10/093,555

(22) Filed: Mar. 8, 2002

(65) Prior Publication Data

US 2002/0134773 A1 Sep. 26, 2002

Related U.S. Application Data

(60) Provisional application No. 60/274,838, filed on Mar. 9, 2001.

(51) Int. Cl.[7] .................................. B23K 26/12
(52) U.S. Cl. .................................. 219/121.86
(58) Field of Search ................. 219/121.86, 121.63, 219/121.64, 121.6, 121.85, 121.82, 121.83; 425/174.4

(56) References Cited

U.S. PATENT DOCUMENTS

| | | | | |
|---|---|---|---|---|
| 5,464,963 A | * | 11/1995 | Hostler et al. | 219/121.82 |
| 5,591,361 A | | 1/1997 | Hostler et al. | |
| 5,643,477 A | * | 7/1997 | Gullo et al. | 219/121.86 |
| 5,658,476 A | | 8/1997 | Gullo et al. | |
| 6,034,349 A | * | 3/2000 | Ota | 219/121.73 |
| 6,147,323 A | | 11/2000 | Erickson et al. | |

* cited by examiner

Primary Examiner—Tom Dunn
Assistant Examiner—Jonathan Johnson
(74) Attorney, Agent, or Firm—Dinsmore & Shohl LLP

(57) ABSTRACT

A laser enclosure is provided including a laser chamber for a robotic laser and a load/un-load region. A partition is positioned between the laser chamber and the load/unload region that is effective in preventing the passage of laser light from the laser chamber to the load/unload region. The partition includes a stationary and a rotary partition that is rotated about a central rotary partition axis by a partition drive. At least one pair of opposing workpiece supports can be mounted on the rotary partition. A light-tight sealing region seals the interface between the rotary and stationary partitions from the passage of laser light.

48 Claims, 9 Drawing Sheets

LIGHT-TIGHT POSITIONER

CROSS-REFERENCE TO RELATED APPLICATION

This application claims the benefit of U.S. Provisional Application Ser. No. 60/274,838, LASER ENCLOSURE, filed Mar. 9, 2001.

BACKGROUND OF THE INVENTION

The present invention relates to enclosures for industrial lasers and, more particularly, to a variety of passive, light-tight sealing arrangements for preventing the escape of harmful laser radiation from an enclosed chamber.

Industrial lasers are commonly used for purposes of cutting and welding. U.S. and international standards have been developed and divide all industrial lasers into four major hazard categories, i.e., four broad classes (I to IV). Laser enclosures are commonly used as protective enclosures for higher powered lasers, e.g., Class II, Class III or Class IV lasers, and allow the higher powered lasers to operate in a lower classification. For example, some Class I industrial lasers consist of a higher class laser enclosed in a properly interlocked and labeled protective enclosure.

A number of conventional laser enclosures utilize active sealing arrangements including one or more motive elements that must be actively controlled or positioned. As such, active laser enclosures are complex, costly to produce, and introduce a substantial limitation on processing efficiency, especially where successive workpieces are to be processed. In addition, a number of conventional laser enclosures incorporate passive sealing arrangements. However, these conventional passive laser enclosures often utilize complex, cumbersome, and difficult to manufacture components. Accordingly, there is a need for an improved laser enclosure which achieves sealing without requiring active drive devices or complex movable sealing members.

SUMMARY OF THE INVENTION

This need is met by the laser enclosure of the present invention. The laser enclosure comprises an enclosed laser chamber which may, for example, encase a Class IV laser to allow it to operate as a Class I laser. With reference to the several embodiments of the present invention described herein, by "light-tight" we mean to reduce the amount of laser light that escapes from the laser enclosure to a level that is below allowable safety standard thresholds.

In accordance with a first embodiment of the present invention, a laser enclosure is provided comprising an enclosed laser chamber, a load/un-load region, and a partition for preventing the passage of laser light from the enclosed laser chamber to the load/un-load region. The partition is positioned between the enclosed laser chamber and the load/un-load region. The partition includes a stationary partition and a rotary partition. The stationary partition includes an upper stationary partition edge and a lower stationary partition edge. The rotary partition includes a central rotary partition axis, at least one pair of opposing workpiece supports, and an upper and lower rotary partition edge.

The laser enclosure further comprises a rotary partition drive, an upper partition interface formed between the upper rotary partition edge and the upper stationary partition edge, and a lower partition interface formed between the lower rotary partition edge and the lower stationary partition edge. A light-tight sealing region formed at a selected one of the upper partition interface and the lower partition interface is configured to seal the selected partition interface from the passage of laser light. The light-tight sealing region includes a curved stationary passage wall, a curved rotary passage wall, a space between the curved stationary passage wall and the curved rotary passage wall. The space between the curved stationary passage wall and the curved rotary passage wall defines an arcuate passage.

The light-tight sealing region can further define an upper and a lower light-tight sealing region formed at the upper and the lower partition interface, respectively, configured to seal the lower and upper partition interfaces from the passage of laser light. The upper and lower light-tight sealing regions include a curved upper and lower stationary passage wall, a curved upper and lower rotary passage wall, and a space between the curved upper and lower stationary passage wall and the curved upper and lower rotary passage wall. The space between the curved upper and lower stationary passage wall and the curved upper and lower rotary passage wall defines an upper and a lower arcuate passage.

When the rotary partition is substantially perpendicular with the floor the arcuate passage forms a light-tight seal at the selected partition interface. The arcuate passage is configured so that laser light entering the arcuate passage undergoes at least three scattering or dispersive reflections along the length of the arcuate passage.

The curved stationary passage wall and the curved rotary passage wall can include a coating. The coating can comprise a carbon black paint or other composition that optimizes the absorption, scattering or dispersion of incident laser light.

The laser enclosure can further include a sidewall light-tight partition configured to prevent the passage of laser light across a sidewall of the rotary partition.

The laser enclosure can further comprise a scrap conveyor assembly which includes a scrap conveyor and a scrap chute. A scrap removal brush is secured to the rotary partition and sweeps along the curved stationary passage wall as the rotary partition is rotated about the central rotary partition axis. The scrap chute is configured to direct scrap to the scrap conveyor and the scrap conveyor is configured to carry the scrap to a scrap depository.

The laser enclosure can further comprise one or more robotic lasers mounted on a robotic laser platform and positioned within the enclosed laser chamber. The rotary partition has a loading face which faces in the direction of the load/un-load region and a processing face which faces in the direction of the enclosed laser chamber. The at least one pair of opposing workpiece supports can be positioned on the loading face of the rotary partition, on the processing face of the rotary partition, or on both the loading face and the processing face of the rotary partition. At least one workpiece can be positioned and secured between the at least one pair of opposing workpiece supports. The rotary partition drive is configured to impart rotary motion to the rotary partition about the central rotary partition axis to rotate the rotary partition 180 degrees about the axis and transport the at least one workpiece between the load/un-load region and the enclosed laser chamber. The rotary partition can be reciprocated 180 degrees to move the at least one workpiece to and from the load/un-load region and the enclosed laser chamber. The rotary partition drive or an additional rotary support drive assembly is configured to impart rotary motion to the at least one pair of opposing workpiece supports to rotate the at least one workpiece about a workpiece axis.

In accordance with another embodiment of the present invention, the light-tight sealing region includes a longitudinal, T-shaped ridge and a longitudinal, T-shaped partition flap. The longitudinal, T-shaped partition flap extends across the length of the stationary partition, and the longitudinal, T-shaped ridge extends across the length of the rotary partition. The light-tight sealing region can further define an upper and a lower light-tight sealing region at the upper and the lower partition interfaces, respectively, configured to seal the upper and lower partition interfaces from the passage of laser light. The upper and lower light-tight sealing regions include a longitudinal, T-shaped ridge and a longitudinal, T-shaped partition flap.

The longitudinal, T-shaped partition flap can be a rigid plate connected to the stationary partition via a hinge or a flexible flap fixed to the stationary partition. When the rotary partition is substantially perpendicular with the floor, the longitudinal, T-shaped partition flap forms a light-tight seal at the selected partition interface when disposed against or interlocked with the longitudinal, T-shaped ridge. The longitudinal, T-shaped partition flap moves freely away from the longitudinal, T-shaped ridge when the rotary partition rotates about the central rotary partition axis. In the lower light-tight sealing region, the longitudinal, T-shaped partition flap is forcibly urged to an upright position against or interlocked with the longitudinal, T-shaped ridge.

The laser enclosure of this embodiment of the present invention can further include a sidewall light-tight partition configured to prevent the passage of laser light across a sidewall of the rotary partition.

In accordance with still another embodiment of the present invention, the light-tight sealing region includes a shallow longitudinal channel and a longitudinal partition flap. The longitudinal partition flap extends across the length of the stationary partition and the shallow longitudinal channel extends across the length of the rotary partition. The light-tight sealing region can further define an upper and a lower light-tight sealing region at the upper and the lower partition interfaces, respectively, configured to seal the upper and lower partition interfaces from the passage of laser light. The upper and lower light-tight sealing regions include a shallow longitudinal channel and a longitudinal partition flap.

The longitudinal partition flap can be a rigid plate connected to the stationary partition via a hinge or a flexible flap fixed to the stationary partition. When the rotary partition is substantially perpendicular with the floor, the longitudinal partition flap forms a light-tight seal at the selected partition interface when disposed within the shallow longitudinal channel. The longitudinal partition flap moves freely out of the shallow longitudinal channel when the rotary partition rotates about the central rotary partition axis. The longitudinal partition flap can be substantially vertical such that the longitudinal partition flap is equally spaced between a pair of walls of the shallow longitudinal channel, disposed within the shallow longitudinal channel in an orientation which is slightly off-center, or disposed within the shallow longitudinal channel in an orientation which is substantially diagonal such that the longitudinal partition flap contacts one of the walls of the shallow longitudinal channel. In the lower light-tight sealing region, the longitudinal partition flap is forcibly urged to an upright position within the shallow longitudinal channel.

The laser enclosure of this embodiment of the present invention can further include a sidewall light-tight partition configured to prevent the passage of laser light across a sidewall of the rotary partition.

In accordance with still another embodiment of the present invention, the light-tight sealing region includes a longitudinal ridge and a longitudinal partition flap. The longitudinal partition flap extends across the length of the stationary partition and the longitudinal ridge extends across the length of the rotary partition. The light-tight sealing region can further define an upper and a lower light-tight sealing region at the upper and the lower partition interfaces, respectively, configured to seal the upper and lower partition interfaces from the passage of laser light. The upper and lower light-tight sealing regions include a longitudinal ridge and a longitudinal partition flap.

The longitudinal partition flap can be a rigid plate connected to the stationary partition via a hinge or a flexible flap fixed to the stationary partition. The longitudinal partition flap can include at least one additional protruding member configured to seal the selected partition interface from the passage of laser light. When the rotary partition is substantially perpendicular with the floor, the longitudinal partition flap forms a light-tight seal at the selected partition interface when disposed against the longitudinal ridge. The longitudinal partition flap moves freely away from the longitudinal ridge when the rotary partition rotates about the central rotary partition axis. In the lower light-tight sealing region, the longitudinal partition flap is forcibly urged to an upright position against the longitudinal ridge.

The laser enclosure of this embodiment of the present invention can further include a sidewall light-tight partition configured to prevent the passage of laser light across a sidewall of the rotary partition.

In still another embodiment of the present invention, the light-tight sealing region includes a pair of longitudinal ridges and a longitudinal partition flap. The longitudinal partition flap extends across the length of the stationary partition and the pair of longitudinal ridges extend across the length of the rotary partition. The longitudinal partition flap can be a rigid plate connected to the stationary partition via a hinge or a flexible flap fixed to the stationary partition.

The light-tight sealing region can further define an upper and a lower light-tight sealing region at the upper and the lower partition interfaces, respectively, configured to seal the upper and lower partition interfaces from the passage of laser light. The upper and lower light-tight sealing regions include a pair of longitudinal ridges and a longitudinal partition flap.

When the rotary partition is substantially perpendicular with the floor, the longitudinal partition flap forms a light-tight seal at the selected partition interface when disposed between the pair of longitudinal ridges. The longitudinal partition flap moves freely out of the space defined between the pair of longitudinal ridges when the rotary partition rotates about the central rotary partition axis. The longitudinal partition flap can be disposed between the pair of longitudinal ridges in an orientation which is slightly off-center, substantially diagonal such that the longitudinal partition flap contacts one of the pair of longitudinal ridges, or substantially vertical such that the longitudinal partition flap is equally spaced between the pair of longitudinal ridges. In the lower light-tight sealing region, the longitudinal partition flap is forcibly urged to an upright position between the pair of longitudinal ridges.

The laser enclosure of this embodiment of the present invention can further include a sidewall light-tight partition configured to prevent the passage of laser light across a sidewall of the rotary partition.

Accordingly, it is an object of the present invention to provide an improved laser enclosure which provides a light-tight seal at a partition interface and which optimized the absorption, scattering or dispersion of incident laser light. These and other objects and advantages of the present invention will be apparent from the following description, the accompanying drawings, and the appended claims.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE INVENTION

Figure 1:
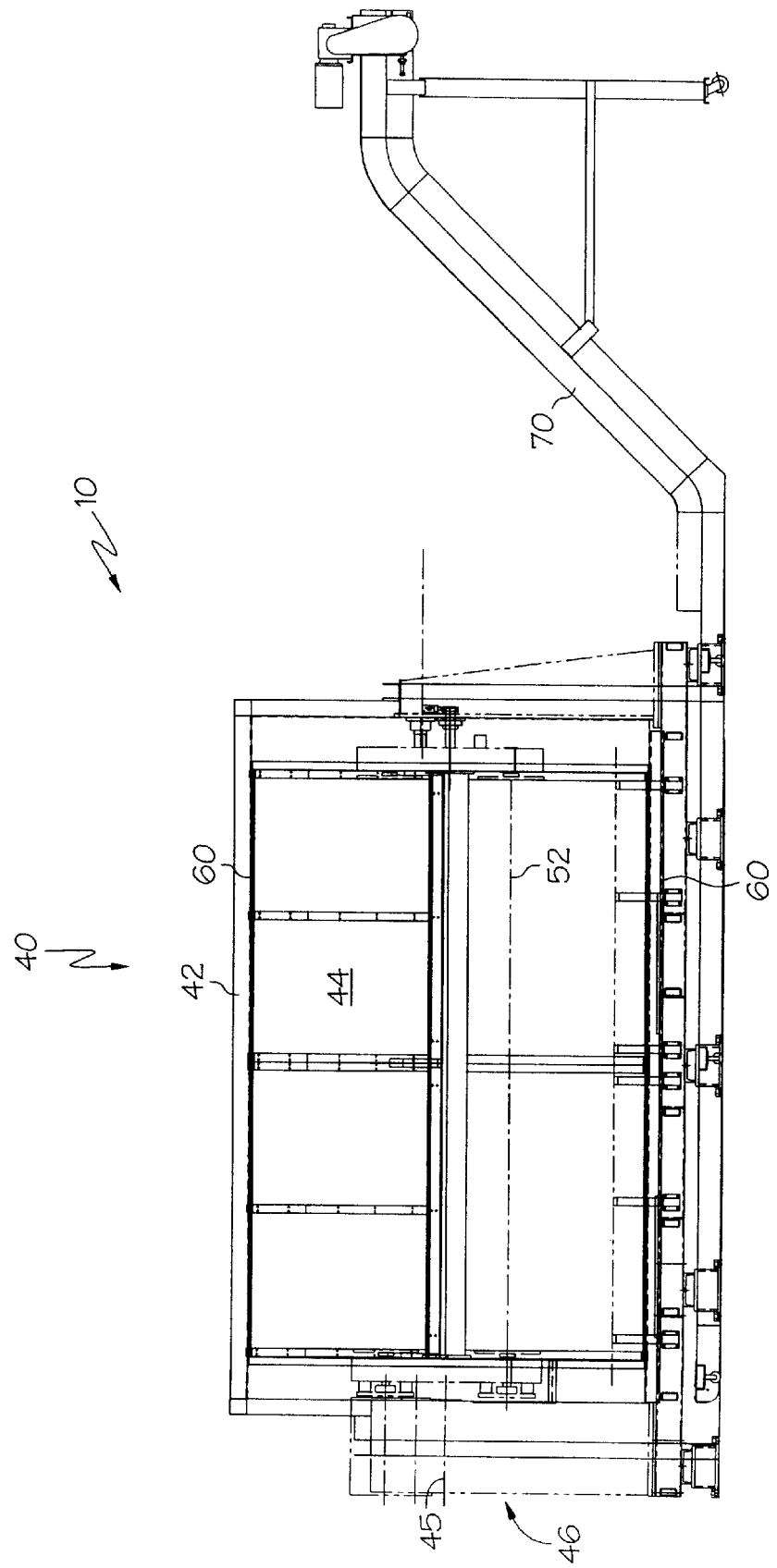
FIGS. 1–3 are front, side, and top views, respectively, of a laser enclosure according to one embodiment of the present invention.
Figure 2:
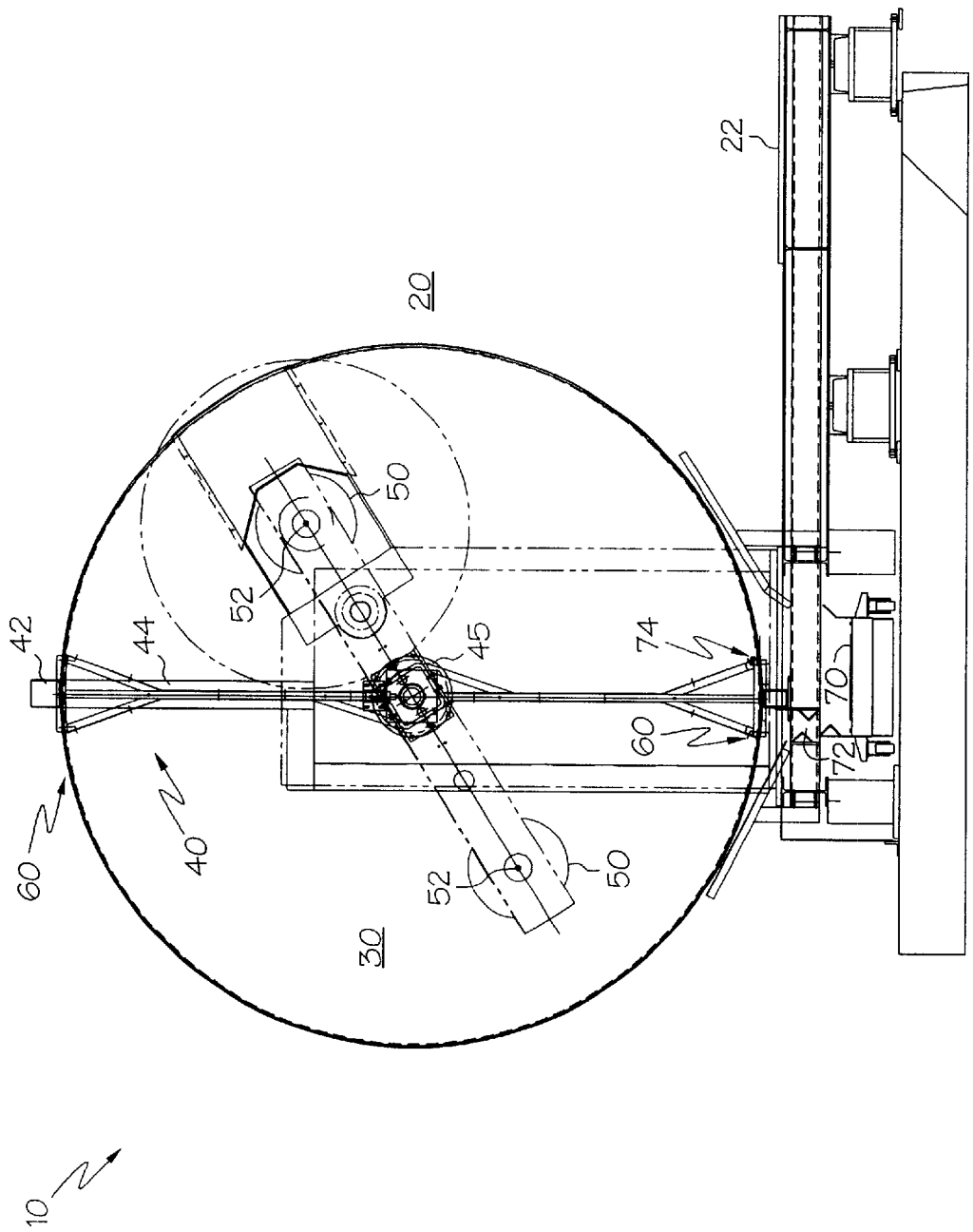
Figure 3:
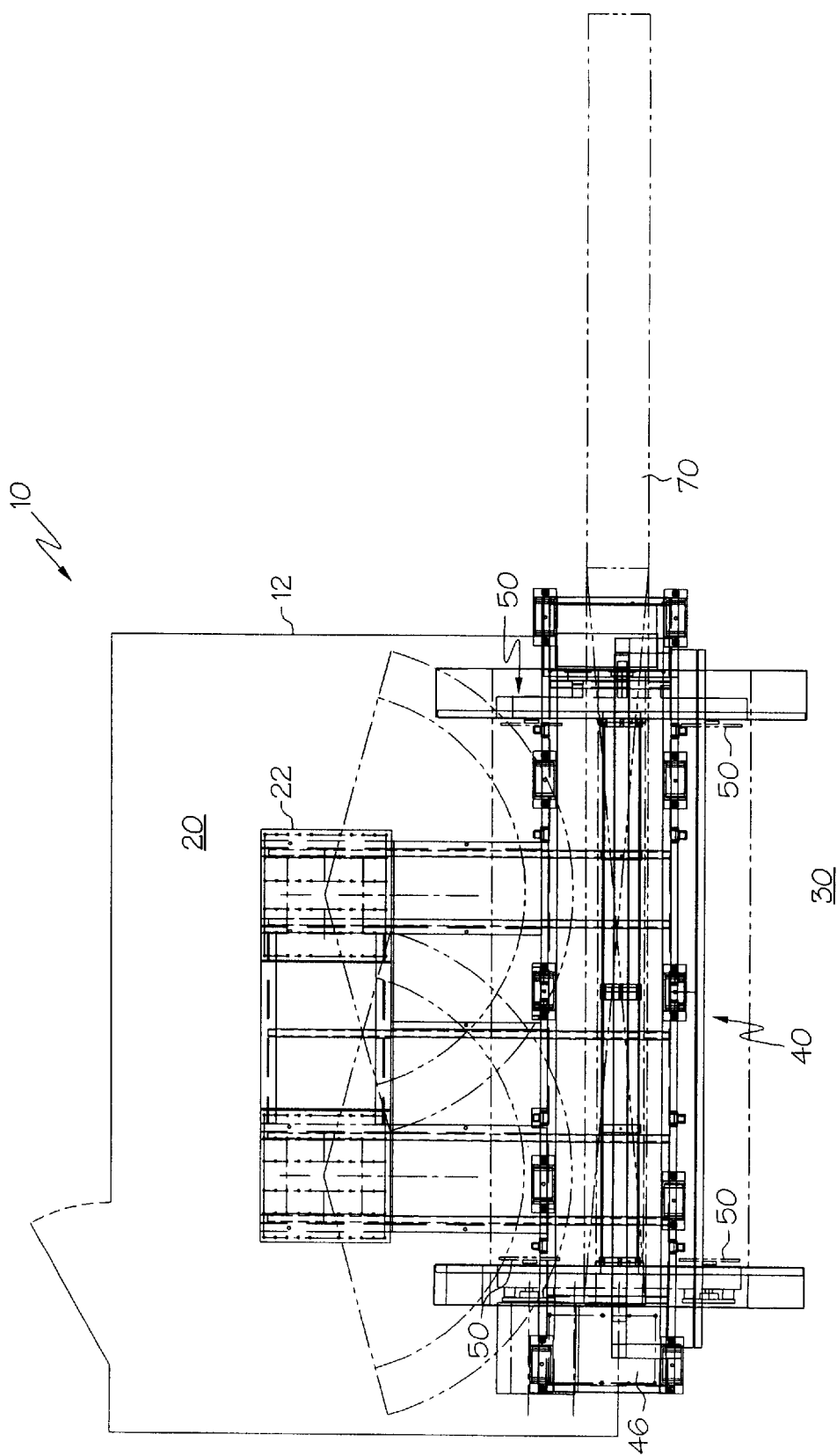

Referring initially to FIGS. 1–3, which present front, side, and top views, respectively, of a laser enclosure 10 according to one embodiment of the present invention, the laser enclosure 10 includes an enclosed laser chamber 20, a load/un-load region 30, and a partition 40 positioned between the enclosed laser chamber 20 and the load/un-load region 30. The enclosed laser chamber 20 is bounded by a plurality of enclosure walls 12. Positioned within the enclosed laser chamber 20 are one or more robotic lasers (not shown) mounted on respective robotic laser platforms 22.

The partition 40 includes two components—a stationary partition 42 and a rotary partition 44. The stationary partition 42 includes an upper and lower stationary partition edge. The rotary partition 44 includes an upper and lower rotary partition edge. The rotary partition 44 can have a loading face which faces in the direction of the load/un-load region 30 and a processing face which faces in the direction of the enclosed laser chamber 20. The rotary partition 44 further includes a central rotary partition axis 45 and at least one pair of opposing workpiece supports 50, which can be positioned on the loading face, on the processing face, or on both the loading face and the processing faces of the rotary partition 44.

A rotary partition drive 46 is configured to impart rotary motion to the rotary partition 44 about the central rotary partition axis 45. In this manner, at least one workpiece (not shown) may be positioned and secured between the at least one pair of opposing workpiece supports 50 in the load/un-load region 30 and then transported to the enclosed laser chamber 20 by rotating the rotary partition 44 180 degrees about the central rotary partition axis 45. In the same manner, a workpiece that has completed laser processing within the enclosed laser chamber 20 may be returned to the load/un-load region 30 and removed from the at least one pair of opposing workpiece supports 50. The rotary partition 44 is typically reciprocated 180 degrees to move workpieces to and from the load/un-load region 30 and the enclosed laser chamber 20. The rotary partition drive 46, or an additional rotary support drive assembly, may be configured to impart rotary motion to the at least one pair of opposing workpiece supports 50 to rotate the at least one workpiece about a workpiece axis 52 to aid in processing the supported workpiece.

The partition 40 prevents the passage of potentially harmful laser light from the enclosed laser chamber 20 to the load/un-load region 30 and does so without the need for electronically controlled sealing elements, active drive devices, or complex movable sealing members. Specifically, a light-tight sealing region 60 is formed at a selected one of the upper and lower partition interfaces, which are formed between the upper and lower edges of the stationary partition 42 and the rotary partition 44, respectively. The light-tight sealing region 60 is configured to seal the selected partition interface from the passage of laser light.

Figure 4:
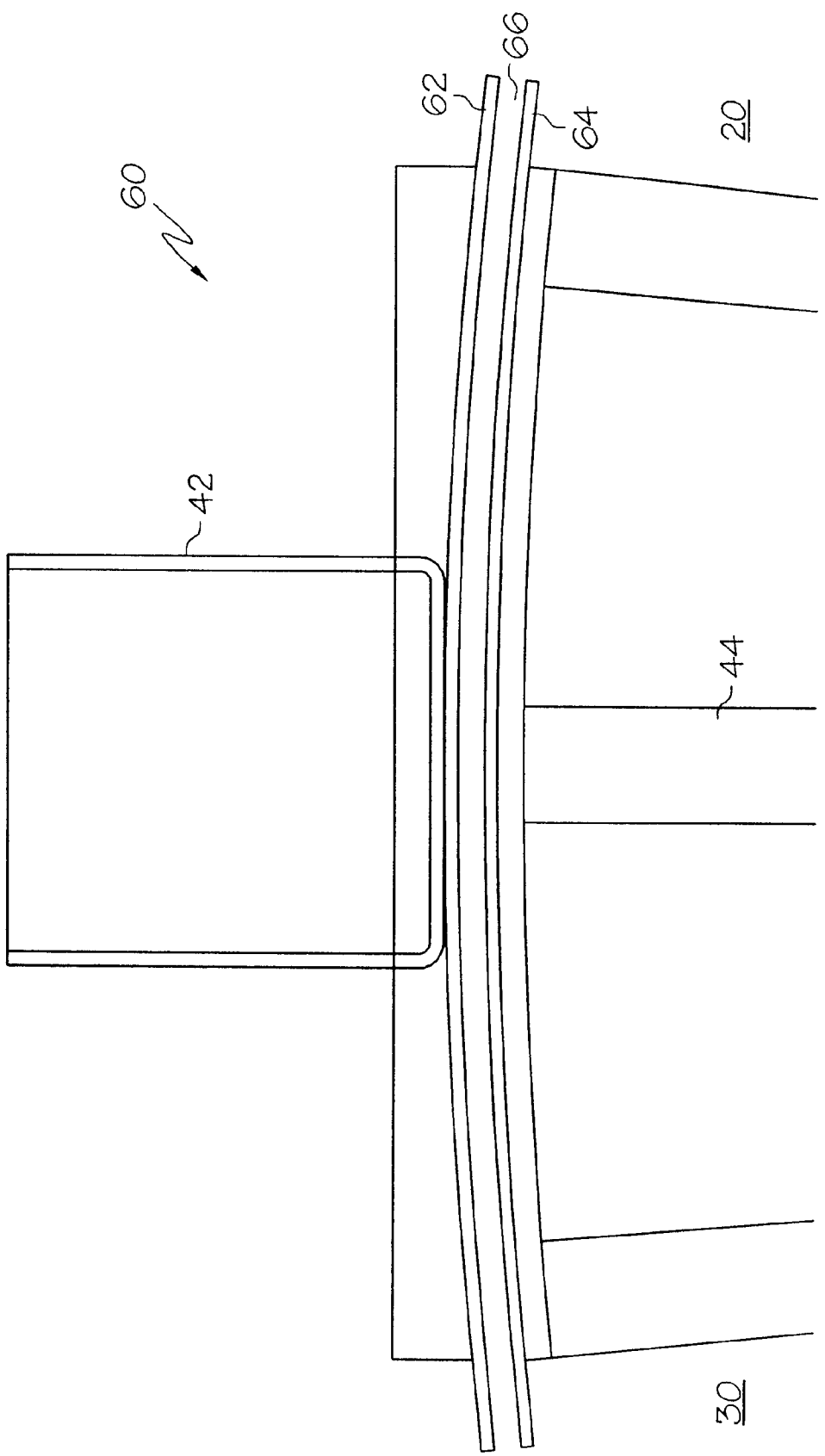
FIG. 4 is an illustration of an arcuate passage employed in the laser enclosure illustrated in FIGS. 1–3.

The structure of the light-tight sealing region 60 according to a primary embodiment of the present invention is illustrated in FIG. 4, with sole reference to an upper light-tight sealing region 60. The selected light-tight sealing region 60 can include a stationary passage wall 62, a rotary passage wall 64, and a space between the stationary passage wall 62 and the rotary passage wall 64. The stationary and rotary passage walls 62,64 are curved so that the space between the passage walls 62,64 forms an arcuate passage 66. When the rotary partition 44 is substantially perpendicular to the floor (see position of rotary partition 44 in FIGS. 1 and 4), the arcuate passage 66 forms a light-tight seal at the selected partition interface. The respective radii of curvature of the passage walls 62,64, and the spacing there between, are selected such that laser light entering the arcuate passage 66 at any angle and from any direction will necessarily be incident upon at least one of the passage walls 62,64. Stated differently, the curvature and spacing of the walls 62,64 will prevent laser light from passing from one end of the arcuate passage 66 to the other unimpeded by the passage walls 62,64. Preferably, the curvature and spacing of the walls 62,64 are such that laser light entering the arcuate passage 66 undergoes at least three scattering or dispersive reflections along the length of the passage 66. The surfaces of the walls 62,64 may include a coating which can comprise a carbon black paint or other composition that optimizes the absorption, scattering or dispersion of incident laser light. The laser enclosure 10 can further include a sidewall light-tight partition configured to prevent the passage of laser light across a sidewall of the rotary partition 44.

Many types of laser processing occurring within the enclosed laser chamber 20 generate a significant amount of scrap or waste material which collects within the enclosed laser chamber 20. The presence of scrap or waste material and the close spacing of the stationary and rotary passage walls 62,64 make scrap control and removal an important concern in the design of the present invention. Consequently, a scrap conveyor assembly including a scrap conveyor 70 and a scrap chute 72 are provided to address this concern (see FIG. 2). In operation, scrap generated in the enclosed laser chamber 20 is expected to fall through the scrap chute 72 on its own. If during indexing scrap were to fall on the stationary passage wall 62 a scrap removal brush 74 would push the scrap out of the way preventing damage to the arcuate passage 66. The scrap removal brush 74 is secured to the rotary partition 44 and sweeps along the surface of the stationary passage wall 62 as the rotary partition 44 is rotated about the central rotary partition axis 45. The scrap chute 72 is configured to direct scrap to the scrap conveyor 70, which is configured to carry the scrap to a scrap depository (not shown). As is clearly illustrated in FIGS. 1–4, the design of the light-tight sealing region 60 of the present embodiment is particularly well suited for incorporation with the scrap conveyor assembly of the present invention.

Figure 5:
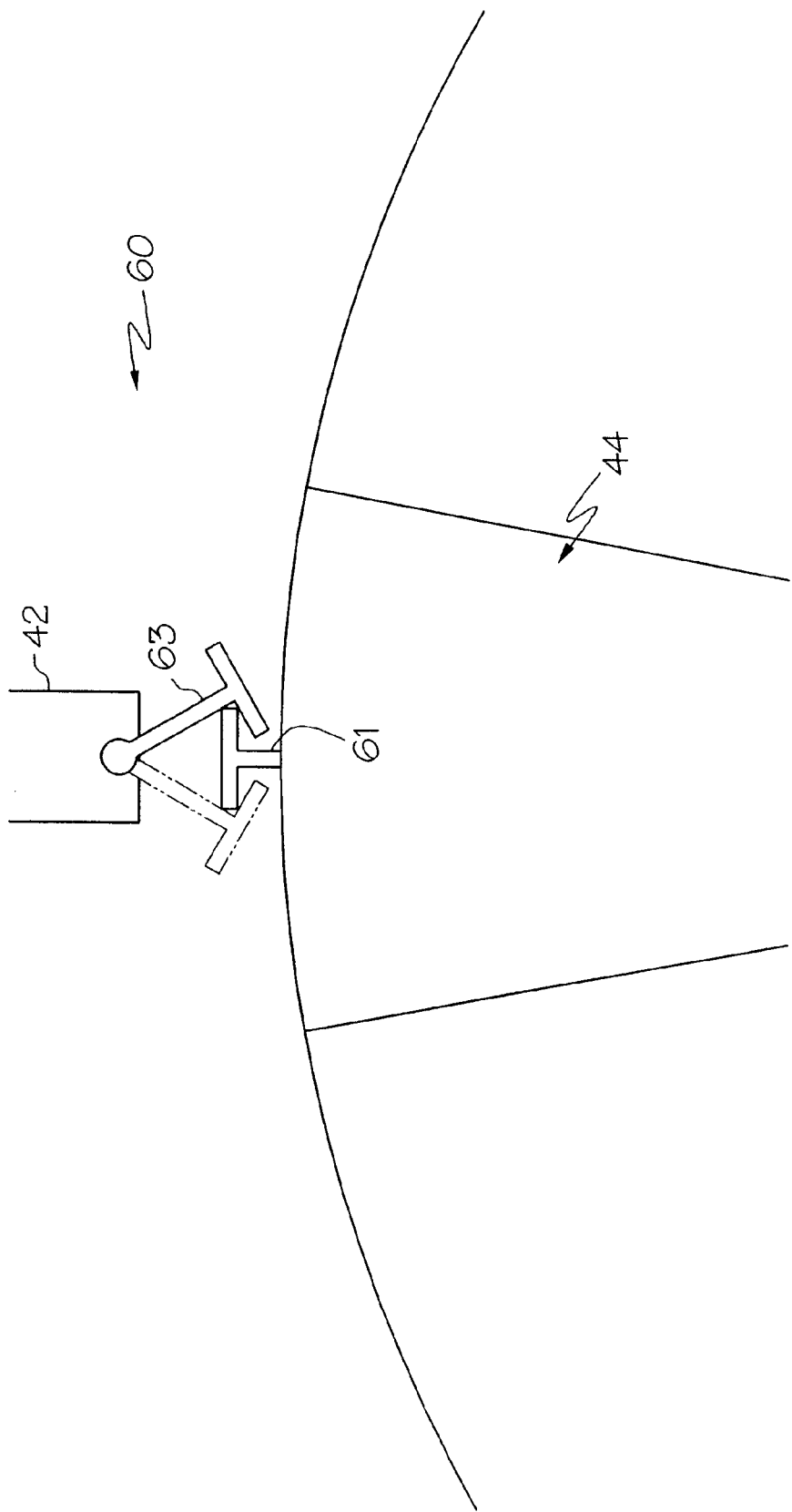
FIG. 5 is an illustration of a longitudinal, T-shaped ridge and a longitudinal, T-shaped partition flap employed in the laser enclosure illustrated in FIGS. 1–3.

The structure of the light-tight sealing region 60 according to an alternative embodiment of the present invention is illustrated more clearly in FIG. 5, again with sole reference to an upper light-tight sealing region 60. The light-tight sealing region 60 includes a longitudinal, T-shaped ridge 61 and a longitudinal, T-shaped partition flap 63. The longitudinal, T-shaped partition flap 63 extends across the length of the stationary partition 42, and the longitudinal, T-shaped ridge 61 extends across the length of the rotary partition 44. In this manner, when the rotary partition 44 is substantially perpendicular with the floor (see position of rotary partition 44 in FIGS. 1 and 5) the longitudinal, T-shaped partition flap 63 is disposed against or interlocked with the longitudinal, T-shaped ridge 61, and moves freely away from the longitudinal, T-shaped ridge 61 when the rotary partition 44 rotates about the central rotary partition axis 45 for workpiece positioning and removal. With the longitudinal, T-shaped partition flap 63 disposed against or interlocked with the longitudinal, T-shaped ridge 61, a light-tight seal is formed at the selected partition interface. The longitudinal, T-shaped partition flap 63 may be a rigid plate connected to the stationary partition 42 via a hinge or a flexible flap fixed to the stationary partition 42. The present embodiment of the invention can further include a sidewall light-tight partition configured to prevent the passage of laser light across a sidewall of the rotary partition 44.

Figure 6:
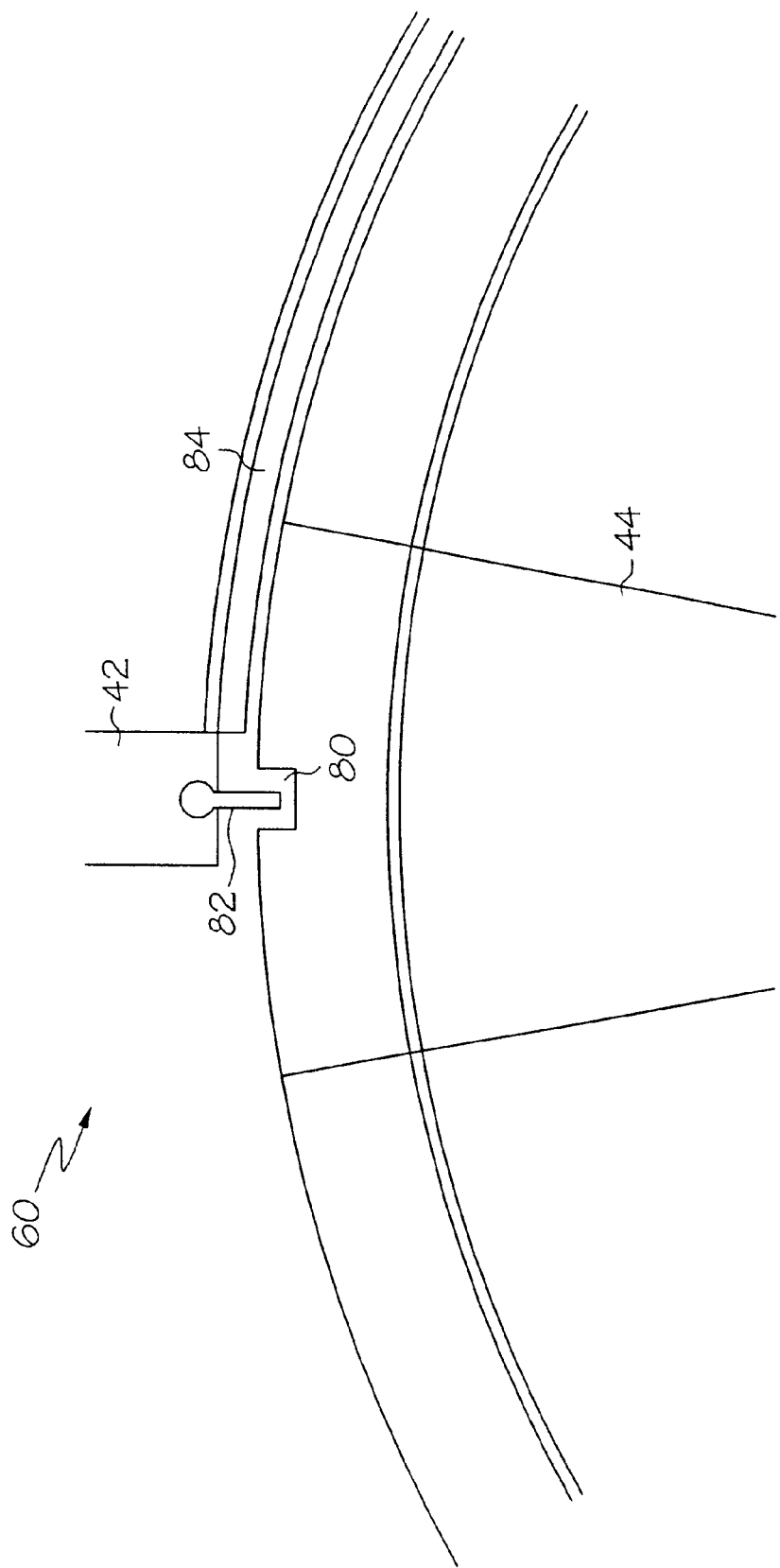
FIG. 6 is an illustration of a shallow longitudinal channel and a longitudinal partition flap employed in the laser enclosure illustrated in FIGS. 1–3.

Referring now to FIG. 6, an alternative light-tight sealing region according to the present invention is described, again with sole reference to an upper light-tight sealing region 60. The light-tight sealing region 60 of FIG. 6 does not employ the longitudinal, T-shaped partition flap 63 illustrated in FIG. 5. Rather, a shallow longitudinal channel 80 and a longitudinal partition flap 82 are provided to seal the interface between the stationary partition 42 and the rotary partition 44. The longitudinal partition flap 82 extends across the length of the stationary partition 42 and the shallow longitudinal channel 80 extends across the length of the rotary partition 44. In this manner, when the rotary partition 44 is substantially perpendicular with the floor (see position of rotary partition 44 in FIGS. 1 and 6), the longitudinal partition flap 82 is disposed within the shallow longitudinal channel 80, and moves freely out of the shallow longitudinal channel 80 when the rotary partition 44 rotates about the central rotary partition axis 45 for workpiece positioning and removal. With the longitudinal partition flap 82 disposed in the shallow longitudinal channel 80, a light-tight seal is formed at the interface between the stationary partition 42 and the rotary partition 44. The longitudinal partition flap 82 may be a rigid plate connected to the stationary partition 42 via a hinge or a flexible flap fixed to the stationary partition 42. It is contemplated that, although the longitudinal partition flap 82 as illustrated in FIG. 6 is disposed within the shallow longitudinal channel 80 in a substantially vertical orientation, equally spaced between a pair of walls of the shallow longitudinal channel 80, the longitudinal partition flap 82 may be positioned in an orientation which is slightly off-center, or substantially diagonal such that the longitudinal partition flap 82 is leaning against or contacting one of the walls of the shallow longitudinal channel 80.

A similar arrangement is presented in a lower light-tight sealing region 60, with the exception that provision is made to ensure that the longitudinal partition flap 82 is forcibly urged to an upright position, against the force of gravity, so that it tends towards insertion into the shallow longitudinal channel 80. Also illustrated in FIG. 6 is one of the sidewall light-tight partitions 84, which are configured to prevent the passage of laser light across a sidewall of the rotary partition 44.

Figure 7:
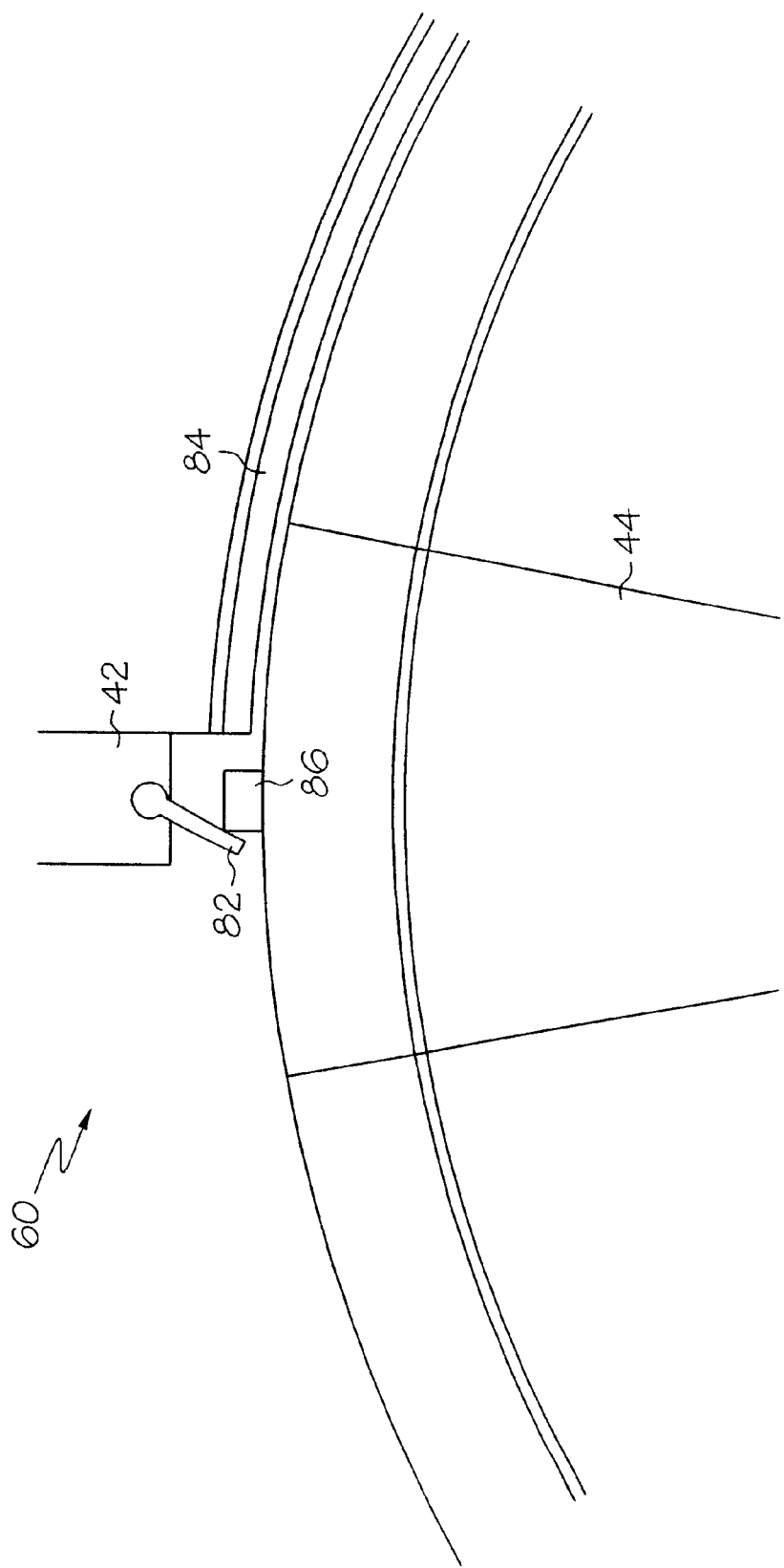
FIG. 7 is an illustration of a longitudinal ridge and a longitudinal partition flap employed in the laser enclosure illustrated in FIGS. 1–3.

Referring now to FIG. 7, a further alternative light-tight sealing region according to the present invention is described, again with sole reference to an upper light-tight sealing region 60. In this embodiment, the shallow longitudinal channel 80 is replaced by a longitudinal ridge 86 that extends across the length of the rotary partition 44. In this manner, when the rotary partition 44 is substantially perpendicular with the floor (see position of rotary partition 44 in FIGS. 1 and 7), the longitudinal partition flap 82 is disposed against the longitudinal ridge 86, and moves freely away from the longitudinal ridge 86 when the rotary partition 44 rotates about the central rotary partition axis 45 for workpiece positioning and removal. With the longitudinal partition flap 82 disposed against the longitudinal ridge 86, a light-tight seal is formed at the interface between the stationary partition 42 and the rotary partition 44. The longitudinal partition flap 82 extends across the length of the stationary partition 42 and can be a rigid plate connected to the stationary partition 42 via a hinge or a flexible flap fixed to the stationary partition 42.

Figure 8:
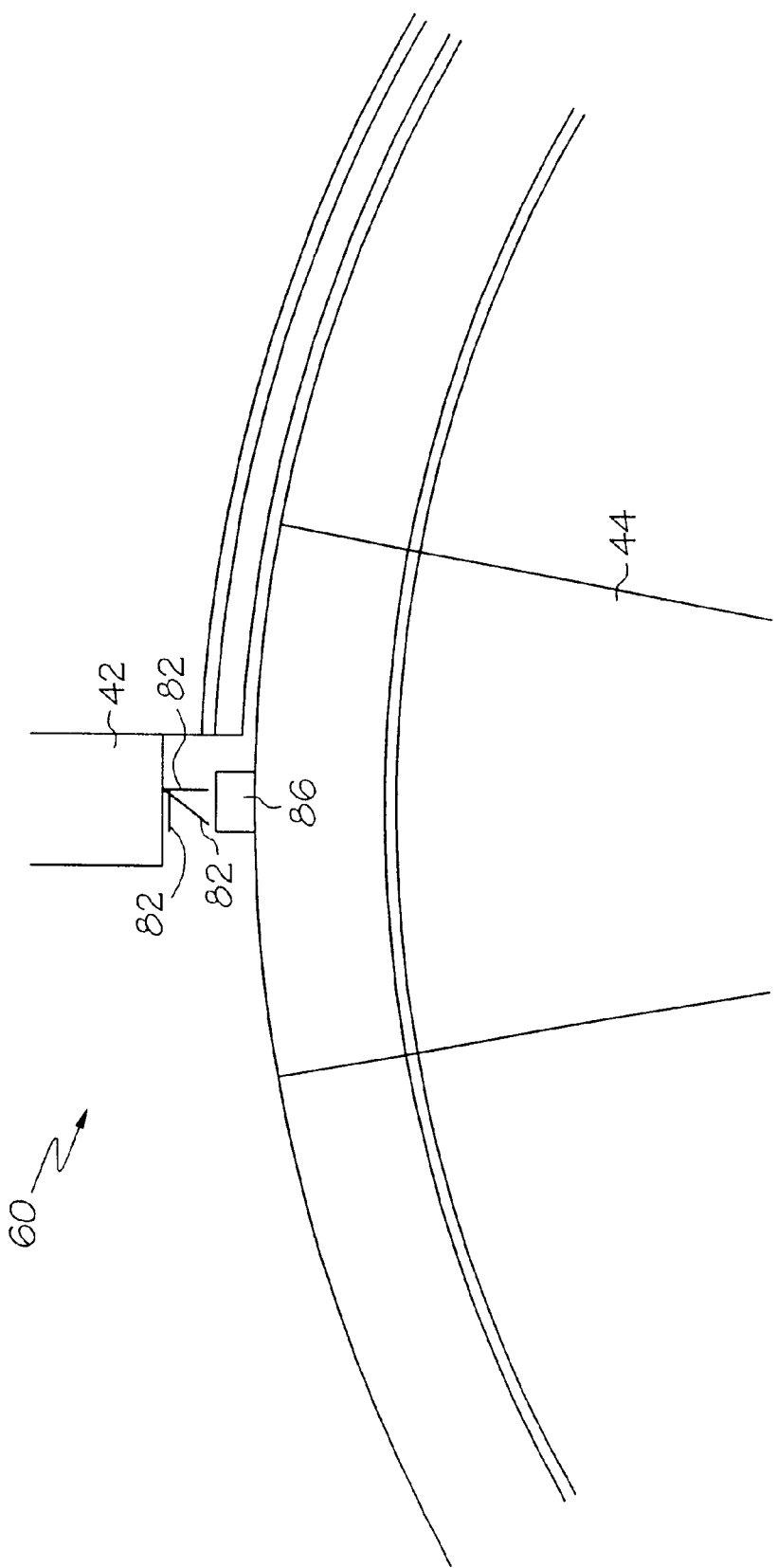
FIG. 8 is an illustration of a longitudinal ridge and three longitudinal partition flaps employed in the laser enclosure illustrated in FIGS. 1–3.

As illustrated in FIG. 8, the longitudinal partition flap 82 can include at least one additional protruding member to further complicate the light path and make the light-tight sealing region 60 less susceptible to the passage of laser light. The present embodiment of the invention (see FIGS. 7 and 8) can further include a sidewall light-tight partition configured to prevent the passage of laser light across a sidewall of the rotary partition 44.

Because the rotary partition 44 is typically reciprocated 180 degrees and not continuously rotated in a single direction, it is not necessary for the longitudinal partition flap 82 to pass over the longitudinal ridge 86, nor the shallow longitudinal channel 80.

Figure 9:
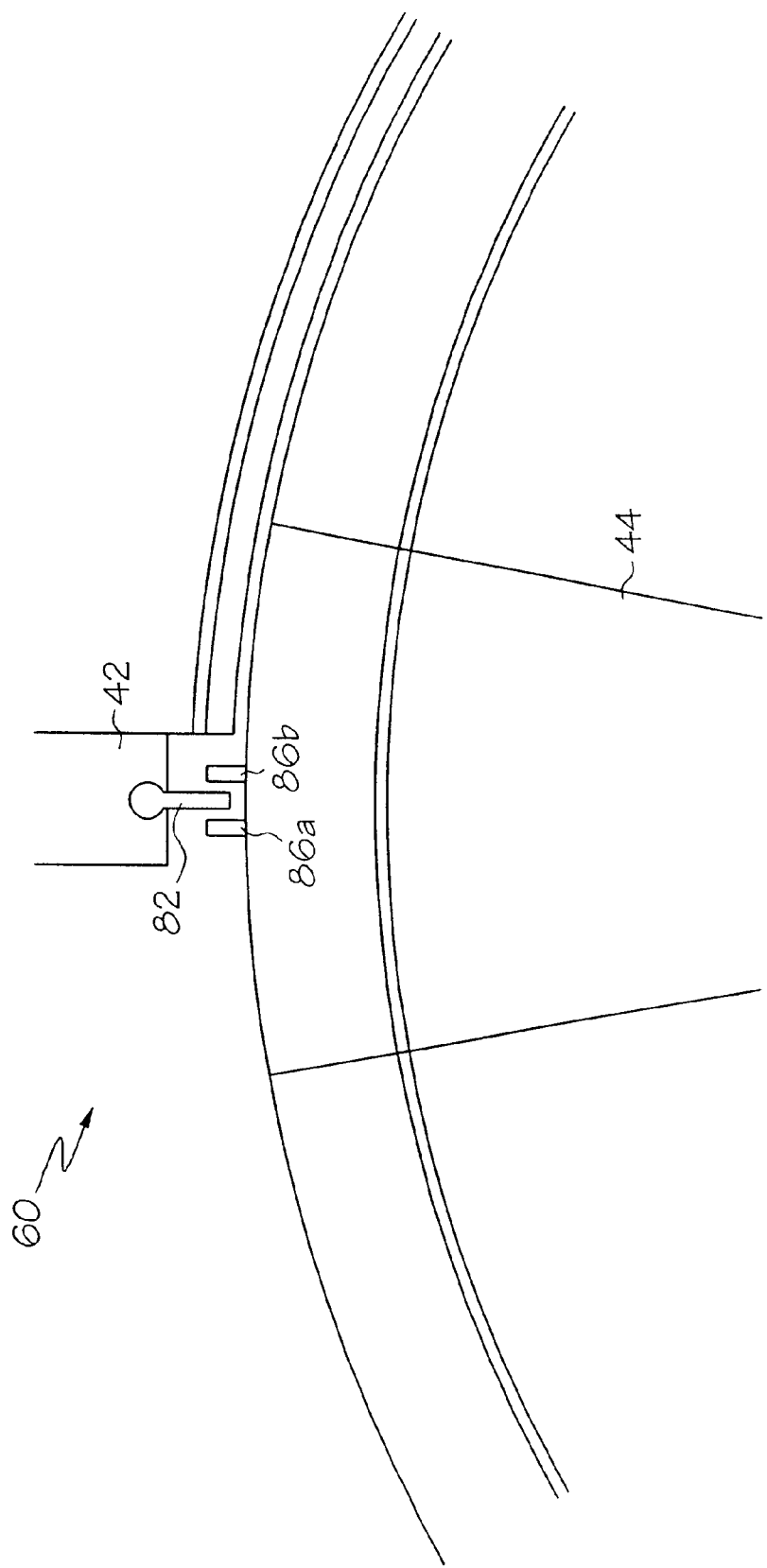
FIG. 9 is an illustration of a pair of longitudinal ridges and a longitudinal partition flap employed in the laser enclosure illustrated in FIGS. 1–3.

Referring now to FIG. 9, a further alternative light-tight sealing region according to the present invention is described, again with sole reference to an upper light-tight sealing region 60. In this embodiment, the light-tight sealing region 60 includes a pair of longitudinal ridges 86a,86b which extend across the length of the rotary partition 44. In this manner, when the rotary partition 44 is substantially perpendicular with the floor (see position of rotary partition 44 in FIGS. 1 and 9), the longitudinal partition flap 82 is disposed between the pair of longitudinal ridges 86a,86b, and moves freely out of the space defined between the pair of longitudinal ridges 86a,86b when the rotary partition 44 rotates about the central rotary partition axis 45 for workpiece positioning and removal. With the longitudinal partition flap 82 disposed between the pair of longitudinal ridges 86a,86b, a light-tight seal is formed at the interface between the stationary partition 42 and the rotary partition 44. The longitudinal partition flap 82 extends across the length of the stationary partition 42 and can be a rigid plate connected to the stationary partition 42 via a hinge or a flexible flap fixed to the stationary partition 42.

It is contemplated that, although the longitudinal partition flap 82 as illustrated in FIG. 9 is disposed between the pair of longitudinal ridges 86a,86b in a substantially vertical or slightly off-center orientation such that the longitudinal partition flap 82 is spaced from an inside wall of each of the pair of longitudinal ridges 86a,86b, the longitudinal partition flap 82 may also be positioned in a substantially diagonal orientation such that the longitudinal partition flap 82 is leaning against or contacting one of the walls of the pair of longitudinal ridges 86a,86b.

A similar arrangement is presented in a lower light-tight sealing region 60, with the exception that provision is made to ensure that the longitudinal partition flap 82 is forcibly urged to an upright position, against the force of gravity, so that it tends towards insertion between the pair of longitudinal ridges 86a,86b. The present embodiment of the invention can further include a sidewall light-tight partition configured to prevent the passage of laser light across a sidewall of the rotary partition 44.

It is further contemplated that the longitudinal flap of the several embodiments of the present invention can define a baffled arrangement with a greater surface area in which to disrupt the passage of laser light through the light-tight sealing arrangement. In addition, the upper and lower light-tight sealing regions of the different embodiments of the present invention can be any conceivable combination, i.e., an upper light-tight sealing region defining an arcuate passage and a lower light-tight sealing arrangement with an interlocking T-shaped ridge and partition flap, among others.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A laser enclosure comprising:
    an enclosed laser chamber;
    a load/un-load region;
    a partition for preventing the passage of laser light from said enclosed laser chamber to said load/un-load region wherein said partition is positioned between said enclosed laser chamber and said load/un-load region, wherein said partition includes a stationary partition and a rotary partition, wherein said stationary partition includes an upper stationary partition edge and a lower stationary partition edge, and wherein said rotary partition includes a central rotary partition axis, at least one pair of opposing workpiece supports, and an upper rotary partition edge and a lower rotary partition edge;
    a rotary partition drive;
    an upper partition interface formed between said upper rotary partition edge and said upper stationary partition edge;
    a lower partition interface formed between said lower rotary partition edge and said lower stationary partition edge; and
    a light-tight sealing region formed at a selected one of said upper partition interface and said lower partition interface configured to seal said selected partition interface from the passage of laser light, wherein said light-tight sealing region includes a curved stationary passage wall, a curved rotary passage wall, and a space between said curved stationary passage wall and said curved rotary passage wall defining an arcuate passage.

2. The laser enclosure of claim 1 wherein said light-tight sealing region further defines an upper light-tight sealing region formed at said upper partition interface and configured to seal said upper partition interface from the passage of laser light, wherein said upper light-tight sealing region includes a curved upper stationary passage wall, a curved upper rotary passage wall, and a space between said curved upper stationary passage wall and said curved upper rotary passage wall, and wherein said space between said curved upper stationary passage wall and said curved upper rotary passage wall defines an upper arcuate passage.

3. The laser enclosure of claim 1 wherein said light-tight sealing region further defines a lower light-tight sealing region formed at said lower partition interface and configured to seal said lower partition interface from the passage of laser light, wherein said lower light-tight sealing region includes a curved lower stationary passage wall, a curved lower rotary passage wall, and a space between said curved lower stationary passage wall and said curved lower rotary passage wall, and wherein said space between said curved lower stationary passage wall and said curved lower rotary passage wall defines a lower arcuate passage.

4. The laser enclosure of claim 1 wherein when said rotary partition is substantially perpendicular with the floor, said arcuate passage forms a light-tight seal at said selected partition interface, and wherein said arcuate passage is configured so that laser light entering said arcuate passage undergoes at least three scattering or dispersive reflections along the length of said arcuate passage.

5. The laser enclosure of claim 1 wherein said curved stationary passage wall and said curved rotary passage wall include a coating.

6. The laser enclosure of claim 5 wherein said coating comprises a carbon black paint or other composition that optimizes the absorption, scattering or dispersion of incident laser light.

7. The laser enclosure of claim 1 wherein said laser enclosure further includes a sidewall light-tight partition, and wherein said sidewall light-tight partition is configured to prevent the passage of laser light across a sidewall of said rotary partition.

8. The laser enclosure of claim 1 further comprising a scrap conveyor assembly wherein said scrap conveyor assembly includes a scrap conveyor and a scrap chute.

9. The laser enclosure of claim 8 wherein a scrap removal brush is secured to said rotary partition and sweeps along said curved stationary passage wall as said rotary partition is rotated about said central rotary partition axis.

10. The laser enclosure of claim 8 wherein said scrap chute is configured to direct scrap to said scrap conveyor, and wherein said scrap conveyor is configured to carry said scrap to a scrap depository.

11. The laser enclosure of claim 1 further comprising one or more robotic lasers wherein each said one or more robotic lasers are mounted on a robotic laser platform and positioned within said enclosed laser chamber.

12. The laser enclosure of claim 1 wherein said rotary partition has a loading face which faces in the direction of said load/un-load region, and wherein said rotary partition has a processing face which faces in the direction of said enclosed laser chamber.

13. The laser enclosure of claim 12 wherein said at least one pair of opposing workpiece supports are positioned on said loading face of said rotary partition, on said processing face of said rotary partition, or on both said loading face and said processing face of said rotary partition.

14. The laser enclosure of claim 13 further comprising at least one workpiece wherein said at least one workpiece is positioned and secured between said at least one pair of opposing workpiece supports.

15. The laser enclosure of claim 14 wherein said rotary partition drive is configured to impart rotary motion to said rotary partition about said central rotary partition axis to rotate said rotary partition 180 degrees about said axis and transport said at least one workpiece between said load/un-load region and said enclosed laser chamber.

16. The laser enclosure of claim 14 wherein said rotary partition is reciprocated 180 degrees to move said at least one workpiece to and from said load/un-load region and said enclosed laser chamber.

17. The laser enclosure of claim 14 wherein said rotary partition drive or an additional rotary support drive assembly is configured to impart rotary motion to said at least one pair of opposing workpiece supports to rotate said at least one workpiece about a workpiece axis.

18. A laser enclosure comprising:
an enclosed laser chamber;
a load/un-load region;
a partition for preventing the passage of laser light from said enclosed laser chamber to said load/un-load region wherein said partition is positioned between said enclosed laser chamber and said load/un-load region, wherein said partition includes a stationary partition and a rotary partition, wherein said stationary partition includes an upper stationary partition edge and a lower stationary partition edge, and wherein said rotary partition includes a central rotary partition axis, at least one pair of opposing workpiece supports, and an upper rotary partition edge and a lower rotary partition edge;
a rotary partition drive;
an upper partition interface formed between said upper rotary partition edge and said upper stationary partition edge;
a lower partition interface formed between said lower rotary partition edge and said lower stationary partition edge; and
a light-tight sealing region formed at a selected one of said upper partition interface and said lower partition interface configured to seal said selected partition interface from the passage of laser light, wherein said light-tight sealing region includes a longitudinal, T-shaped ridge and a longitudinal, T-shaped partition flap, wherein said longitudinal, T-shaped partition flap extends across the length of said stationary partition, and wherein said longitudinal, T-shaped ridge extends across the length of said rotary partition.

19. The laser enclosure of claim 18 wherein said light-tight sealing region further defines an upper light-tight sealing region formed at said upper partition interface and configured to seal said upper partition interface from the passage of laser light, wherein said upper light-tight sealing region includes a longitudinal, T-shaped ridge and a longitudinal, T-shaped partition flap, wherein said longitudinal, T-shaped partition flap extends across the length of said stationary partition, and wherein said longitudinal, T-shaped ridge extends across the length of said rotary partition.

20. The laser enclosure of claim 18 wherein said light-tight sealing region further defines a lower light-tight sealing region formed at said lower partition interface and configured to seal said lower partition interface from the passage of laser light, wherein said lower light-tight sealing region includes a longitudinal, T-shaped ridge and a longitudinal, T-shaped partition flap, wherein said longitudinal, T-shaped partition flap extends across the length of said stationary partition, and wherein said longitudinal, T-shaped ridge extends across the length of said rotary partition.

21. The laser enclosure of claim 18 wherein said longitudinal, T-shaped partition flap is a rigid plate connected to said stationary partition via a hinge or a flexible flap fixed to said stationary partition.

22. The laser enclosure of claim 18 wherein when said rotary partition is substantially perpendicular with the floor, said longitudinal, T-shaped partition flap forms a light-tight seal at said selected partition interface when disposed against or interlocked with said longitudinal, T-shaped ridge, and wherein said longitudinal, T-shaped partition flap moves freely away from said longitudinal, T-shaped ridge when said rotary partition rotates about said central rotary partition axis.

23. The laser enclosure of claim 20 wherein in said lower light-tight sealing region, said longitudinal, T-shaped partition flap is forcibly urged to an upright position against or interlocked with said longitudinal, T-shaped ridge.

24. The laser enclosure of claim 18 wherein said laser enclosure further includes a sidewall light-tight partition, and wherein said sidewall light-tight partition is configured to prevent the passage of laser light across a sidewall of said rotary partition.

25. A laser enclosure comprising:
an enclosed laser chamber;
a load/un-load region;
a partition for preventing the passage of laser light from said enclosed laser chamber to said load/un-load region wherein said partition is positioned between said enclosed laser chamber and said load/un-load region, wherein said partition includes a stationary partition and a rotary partition, wherein said stationary partition includes an upper stationary partition edge and a lower stationary partition edge, and wherein said rotary partition includes a central rotary partition axis, at least one pair of opposing workpiece supports, and an upper rotary partition edge and a lower rotary partition edge;
a rotary partition drive;
an upper partition interface formed between said upper rotary partition edge and said upper stationary partition edge;
a lower partition interface formed between said lower rotary partition edge and said lower stationary partition edge; and
a light-tight sealing region formed at a selected one of said upper partition interface and said lower partition interface configured to seal said selected partition interface from the passage of laser light, wherein said light-tight sealing region includes a shallow longitudinal channel and a longitudinal partition flap, wherein said longitudinal partition flap extends across the length of said stationary partition, and wherein said shallow longitudinal channel extends across the length of said rotary partition.

26. The laser enclosure of claim 25 wherein said light-tight sealing region further defines an upper light-tight sealing region formed at said upper partition interface and configured to seal said upper partition interface from the passage of laser light, wherein said upper light-tight sealing region includes a shallow longitudinal channel and a longitudinal partition flap, wherein said longitudinal partition flap extends across the length of said stationary partition, and wherein said shallow longitudinal channel extends across the length of said rotary partition.

27. The laser enclosure of claim 25 wherein said light-tight sealing region further defines a lower light-tight sealing region formed at said lower partition interface and configured to seal said lower partition interface from the passage of laser light, wherein said lower light-tight sealing region includes a shallow longitudinal channel and a longitudinal partition flap, wherein said longitudinal partition flap extends across the length of said stationary partition, and wherein said shallow longitudinal channel extends across the length of said rotary partition.

28. The laser enclosure of claim 25 wherein said longitudinal partition flap is a rigid plate connected to said stationary partition via a hinge or a flexible flap fixed to said stationary partition.

29. The laser enclosure of claim 25 wherein when said rotary partition is substantially perpendicular with the floor, said longitudinal partition flap forms a light-tight seal at said selected partition interface when disposed within said shallow longitudinal channel, and wherein said longitudinal partition flap moves freely out of said shallow longitudinal channel when said rotary partition rotates about said central rotary partition axis.

30. The laser enclosure of claim 29 wherein said longitudinal partition flap is substantially vertical such that said longitudinal partition flap is equally spaced between a pair of walls of said shallow longitudinal channel, disposed within said shallow longitudinal channel in an orientation which is slightly off-center, or disposed within said shallow longitudinal channel in an orientation which is substantially diagonal such that said longitudinal partition flap contacts one of said walls of said shallow longitudinal channel.

31. The laser enclosure of claim 27 wherein in said lower light-tight sealing region, said longitudinal partition flap is forcibly urged to an upright position within said shallow longitudinal channel.

32. The laser enclosure of claim 25 wherein said laser enclosure further includes a sidewall light-tight partition, and wherein said sidewall light-tight partition is configured to prevent the passage of laser light across a sidewall of said rotary partition.

33. A laser enclosure comprising:
an enclosed laser chamber;
a load/un-load region;
a partition for preventing the passage of laser light from said enclosed laser chamber to said load/un-load region wherein said partition is positioned between said enclosed laser chamber and said load/un-load region, wherein said partition includes a stationary partition and a rotary partition, wherein said stationary partition includes an upper stationary partition edge and a lower stationary partition edge, and wherein said rotary partition includes a central rotary partition axis, at least one pair of opposing workpiece supports, and an upper rotary partition edge and a lower rotary partition edge;
a rotary partition drive;
an upper partition interface formed between said upper rotary partition edge and said upper stationary partition edge;
a lower partition interface formed between said lower rotary partition edge and said lower stationary partition edge; and
a light-tight sealing region formed at a selected one of said upper partition interface and said lower partition interface configured to seal said selected partition interface from the passage of laser light, wherein said light-tight sealing region includes a longitudinal ridge and a longitudinal partition flap, wherein said longitudinal partition flap extends across the length of said stationary partition, and wherein said longitudinal ridge extends across the length of said rotary partition.

34. The laser enclosure of claim 33 wherein said light-tight sealing region further includes an upper light-tight sealing region formed at said upper partition interface and configured to seal said upper partition interface from the passage of laser light, wherein said upper light-tight sealing region includes a longitudinal ridge and a longitudinal partition flap, wherein said longitudinal partition flap extends across the length of said stationary partition, and wherein said longitudinal ridge extends across the length of said rotary partition.

35. The laser enclosure of claim 33 wherein said light-tight sealing region further includes a lower light-tight sealing region formed at said lower partition interface and configured to seal said lower partition interface from the passage of laser light, wherein said lower light-tight sealing region includes a longitudinal ridge and a longitudinal partition flap, wherein said longitudinal partition flap extends across the length of said stationary partition, and wherein said longitudinal ridge extends across the length of said rotary partition.

36. The laser enclosure of claim 33 wherein said longitudinal partition flap is a rigid plate connected to said stationary partition via a hinge or a flexible flap fixed to said stationary partition.

37. The laser enclosure of claim 33 wherein said longitudinal partition flap includes at least one additional protruding member, and wherein said at least one additional protruding member is configured to seal said selected partition interface from the passage of laser light.

38. The laser enclosure of claim 33 wherein when said rotary partition is substantially perpendicular with the floor, said longitudinal partition flap forms a light-tight seal at said selected partition interface when disposed against said longitudinal ridge, and wherein said longitudinal partition flap moves freely away from said longitudinal ridge when said rotary partition rotates about said central rotary partition axis.

39. The laser enclosure of claim 35 wherein in said lower light-tight sealing region, said longitudinal partition flap is forcibly urged to an upright position against said longitudinal ridge.

40. The laser enclosure of claim 33 wherein said laser enclosure further includes a sidewall light-tight partition, and wherein said sidewall light-tight partition is configured to prevent the passage of laser light across a sidewall of said rotary partition.

41. A laser enclosure comprising:
an enclosed laser chamber;
a load/un-load region;
a partition for preventing the passage of laser light from said enclosed laser chamber to said load/un-load region wherein said partition is positioned between said enclosed laser chamber and said load/un-load region, wherein said partition includes a stationary partition and a rotary partition, wherein said stationary partition includes an upper stationary partition edge and a lower stationary partition edge, and wherein said rotary partition includes a central rotary partition axis, at least one pair of opposing workpiece supports, and an upper rotary partition edge and a lower rotary partition edge;

a rotary partition drive;

an upper partition interface formed between said upper rotary partition edge and said upper stationary partition edge;

a lower partition interface formed between said lower rotary partition edge and said lower stationary partition edge; and a light-tight sealing region formed at a selected one of said upper partition interface and said lower partition interface configured to seal said selected partition interface from the passage of laser light, wherein said light-tight sealing region includes a pair of longitudinal ridges and a longitudinal partition flap, wherein said longitudinal partition flap extends across the length of said stationary partition, and wherein said pair of longitudinal ridges extend across the length of said rotary partition.

42. The laser enclosure of claim 41 wherein said light-tight sealing region further defines an upper light-tight sealing region formed at said upper partition interface and configured to seal said upper partition interface from the passage of laser light, wherein said upper light-tight sealing region includes a pair of longitudinal ridges and a longitudinal partition flap, wherein said longitudinal partition flap extends across the length of said stationary partition, and wherein said pair of longitudinal ridges extend across the length of said rotary partition.

43. The laser enclosure of claim 41 wherein said light-tight sealing region further defines a lower light-tight sealing region formed at said lower partition interface and configured to seal said lower partition interface from the passage of laser light, wherein said lower light-tight sealing region includes a pair of longitudinal ridges and a longitudinal partition flap, wherein said longitudinal partition flap extends across the length of said stationary partition, and wherein said pair of longitudinal ridges extend across the length of said rotary partition.

44. The laser enclosure of claim 41 wherein said longitudinal partition flap is a rigid plate connected to said stationary partition via a hinge or a flexible flap fixed to said stationary partition.

45. The laser enclosure of claim 41 wherein when said rotary partition is substantially perpendicular with the floor, said longitudinal partition flap forms a light-tight seal at said selected partition interface when disposed between said pair of longitudinal ridges, and wherein said longitudinal partition flap moves freely out of the space defined between the pair of longitudinal ridges when said rotary partition rotates about said central rotary partition axis.

46. The laser enclosure of claim 45 wherein said longitudinal partition flap is disposed between said pair of longitudinal ridges in an orientation which is slightly off-center, substantially diagonal such that said longitudinal partition flap contacts one of said pair of longitudinal ridges, or substantially vertical such that said longitudinal partition flap is equally spaced between said pair of longitudinal ridges.

47. The laser enclosure of claim 43 wherein in said lower light-tight sealing region, said longitudinal partition flap is forcibly urged to an upright position between said pair of longitudinal ridges.

48. The laser enclosure of claim 41 wherein said laser enclosure further includes a sidewall light-tight partition, and wherein said sidewall light-tight partition is configured to prevent the passage of laser light across a sidewall of said rotary partition.

* * * * *